United States Patent [19]

Harter et al.

[11] 4,051,043
[45] Sept. 27, 1977

[54] APPARATUS FOR FLUID TREATMENT BY ELECTRON EMISSION

[75] Inventors: Joseph William Harter, Los Angeles; Stuart Wallace Beitzel, Santa Monica, both of Calif.

[73] Assignee: O-3 Company, Los Angeles, Calif.

[21] Appl. No.: 652,633

[22] Filed: Jan. 26, 1976

[51] Int. Cl.$^2$ .............................................. C01B 13/11
[52] U.S. Cl. .................................... 250/531; 204/164; 204/176; 250/536; 323/44 R; 323/58; 363/39
[58] Field of Search ............... 204/164, 170, 171, 174, 204/176–179; 250/531–542; 55/105, 139; 323/44 R, 58; 321/9 R

[56] References Cited

U.S. PATENT DOCUMENTS

| 2,857,323 | 10/1958 | Cromwell | 204/176 |
| 3,607,714 | 9/1971 | Vialarou | 250/545 |
| 3,658,673 | 4/1972 | Kugler et al. | 204/164 |
| 3,784,838 | 1/1974 | Lowther | 250/536 |
| 3,800,210 | 3/1974 | Caussin | 321/9 R |
| 3,883,413 | 5/1975 | Douglas-Hamilton | 204/176 |
| 3,899,685 | 8/1975 | Francis et al. | 250/536 |
| 3,902,071 | 8/1975 | Horowitz | 250/543 |

FOREIGN PATENT DOCUMENTS

| 1,533,302 | 6/1968 | France | 250/536 |
| 2,525,059 | 12/1975 | Germany | 250/536 |

Primary Examiner—T. Tung
Assistant Examiner—Aaron Weisstuch
Attorney, Agent, or Firm—Edward D. O'Brian

[57] ABSTRACT

Improved efficiencies in the treatment of a fluid such as oxygen or an oxygen containing gas by electron emission so as to produce a product such as ozone may be achieved by regulating the manner in which energy is used within a fluid treatment cell and the circuit used to power such a cell. Such a cell normally consists of two electrodes separated from one another by a dielectric layer and an air gap. The apparatus used to power such a cell preferably includes a power supply, a timing generator, transistors for releasing power from the power supply to a transformer at periodic intervals, diodes for permitting power to be reconveyed from the transformer to the power supply, an inductance either built into or associated with the secondary of the transformer, this secondary being connected across the terminals of the cell. With this circuit energy is stored in the cell and in both of the inductances as power is supplied. Such energy is used on the reversal of the polarity of the cell before power is released to the cell. This promotes efficiency in terms of the amount of power consumed per unit of power produced.

13 Claims, 6 Drawing Figures

APPARATUS FOR FLUID TREATMENT BY ELECTRON EMISSION

CROSS REFERENCE TO RELATED APPLICATIONS

The subject matter set forth in this specification is utilized with other subject matters as are considered inventive in obtaining presently preferred results in accordance with this invention. Such other subject matters are as set forth in the following U.S. patent application:

Harter, et al. application Ser. No. 659,929 filed, February 20, 1976 entitled "Apparatus for Fluid Treatment by Electron Emission".

BACKGROUND OF THE INVENTION

The invention set forth in this specification is primarily directed to the construction and operation of ozonizers, including the circuits used in operating such devices. However, the principles of this invention are capable of being utilized in any treatment of other fluids by electron emission so as to accomplish one or more chemical changes and/or reactions.

The term "ozonizers" is commonly utilized to designate a device employed to treat either pure oxygen or an oxygen containing gas mixture such as air to produce ozone as a result of chemical changes and/or reactions occuring as a consequence of electron emission. Such ozonizers are normally constructed so as to include one or more electro-chemical "cells" for the production of ozone. Each of such cells is usually constructed so as to include two spaced, parallel electrodes separated by a dielectric or dielectric layer of uniform thickness and an air gap of uniform thickness. Normally such a cell is constructed so that the dielectric or dielectric layer is in direct, intimate contact with one of the electrodes.

During the utilization of such an ozonizer a gas as indicated in the preceding is passed through the air gap while a current is applied to the electrodes so as to cause electron emission in the air gap. Such an electron emission promotes various chemical reactions. In the production of ozone the electron movement is normally considered to break up the normal $O_2$ oxygen molecule so as to form both the $O+$ and the $O_2+$ ions. These may be referred to as "activated" atoms and molecules. They recombine so as to form the $O_3$ ozone molecule. This molecule is comparatively unstable and is considered to break down in an ozonizer so as to form oxygen ions and the oxygen $O_2$ molecule. Much of the efficiency of an ozonizer is the result of operating such an ozonizer in such a manner and with such a current as to maximize the amount of $O_3$ produced at the outlet of the air gap per unit of current applied to the ozonizer.

The current used to operate such an ozonizer is recognized to be quite important. For reasons which are well understood it is conventional to employ an AC current having a sine-wave type of shape and frequencies of at least up to about 1,000 cycles per second. At least one authority has indicated that the wave form of the AC current used has no pronounced effect on the production of ozone. Frequently voltages of up to about 25,000 volts have been employed in these devices. It has been commonly recognized that such voltages should be used with relatively low current densities in the production of ozone since any significant heating in an ozonizer resulting from the use of high current densities will tend to promote the decomposition of such ozone as it is produced in a device of this type.

It is considered that virtually all aspects of the construction and operation of conventional ozonizers are primarily based upon essentially empirical observations. In other words, it is considered that the natures of the currents used in ozonizers, the specific dimensions of parts of these devices and the like, have been derived at as a result of observations indicating that specific changes and/or modes of operation would be desirable in increasing the efficiency of ozone production. Unquestionably such empirical approaches have value and are utilitarian.

However, it is considered that there remains a need for improvement in connection with the production of ozone because the efficiencies of ozone production from an economic standpoint are suficiently unfavorable at the present time so that frequently other oxidizing agents than ozone are used in applications where ozone would be more desirable than such other agents. This need for improvement is not considered to be restricted to the field of the production of ozone. Electron emission is recognized as being capable of being used with many different liquid and gaseous fluids to promote and/or cause chemical changes and/or reactions. The use of electron emission for a wide variety of diverse chemical purposes is considered to be limited by the comparatively low efficiencies of known apparatuses, including the electrical components used with or to power emission cells.

SUMMARY OF THE INVENTION

The invention set forth in this specification is intended to improve the efficiency of processes in which electron emission is used to promote or cause chemical reactions and/or changes in terms of the amount of any such reaction or change per unit of electric power consumed or used. Thus, as applied to ozone production, the invention is intended to increase the amount of ozone produced per unit of electric power consumed. The amount of any such increase in efficiency will, of course, be dependent upon a number of interrelated matters outside of the scope of the invention described in this specification. Because of this it is impossible to state that in all cases any specific degree of improvement in efficiency will be achieved.

In accordance with this invention such an increase in efficiency is achieved in a process of fluid treatment by electron emission carried out utilizing a cell consisting of two parallel, electrically conductive electrodes separated from one another by a dielectric layer of uniform thickness located parallel to the electrodes and an air gap of uniform thickness, a first of these electrodes having a surface exposed to the air gap, the dielectric layer also having a surface exposed to the air gap, the process including the steps of passing the fluid to be treated through the air gap, applying an alternating current to the electrodes while the fluid is passed through the air gap, the current serving to result in the emission of electrons into the air gap, and contacting the fluid by the electrons emitted so as to result in treatment of the fluid by these electrons.

It will be realized that the various process steps indicated in the preceding discussion are of course well known in the field of fluid treatment by electron emission. The present invention involves the controlled use of the energy and/or current applied during each half or partial cycle of use of a current by including the steps of applying a current of a first polarity to the cell so as to charge said cell in a first direction and so as to cause electron emission within this cell, this application of a current or current pulse serving to store energy within the cell in the form of an electrostatic field (or in the form of electrostatic fields) associated with the cell.

While the current is applied to the cell a part of the electrical energy applied to the cell is stored in the form of a magnetic field associated with an inductance shorted or shunted across the terminals of the cell. When the application of a current or current pulse is terminated after a short time interval the energy stored within the fields associated with the cell and the inductance is used to provide a derived current which is then used to change the polarity of the cell and too commence charging the cell in a reverse polarity prior to power being applied in this reverse polarity to commence the next partial or half cycle of operation. Preferably, however, the energy utilization in practicing the process of the invention is much more complex than this in that it involves storing a further part of the electrical energy applied to the cell as power is being supplied in the form of another field associated with an inductance in the supply circuit. Preferably such inductance is either wholly or partially integral with the transformer. The energy stored in this field and in the other fields noted is not only employed to change the polarity of the cell but also to supply power back to the power supply so that it can be reused the next time power is supplied to the cell from the power supply.

The invention contemplates the utilization of circuit components to provide the mode of operation as indicated. These components include a DC power supply, a timing means, current release means operatively connected to the power supply and the timing means for releasing current from the supply means, transformer means connected to the release means for varying the voltage of the current released and for storing electrical energy, and ozone cell having electrodes connected to the output terminals of the transformer means and an inductor means connected across the electrodes of the emission cell for storing and transferring energy.

BRIEF DESCRIPTION OF THE DRAWING

The invention is best more fully described with reference to the accompanying drawing in which.

BRIEF DESCRIPTION

Figure 1:
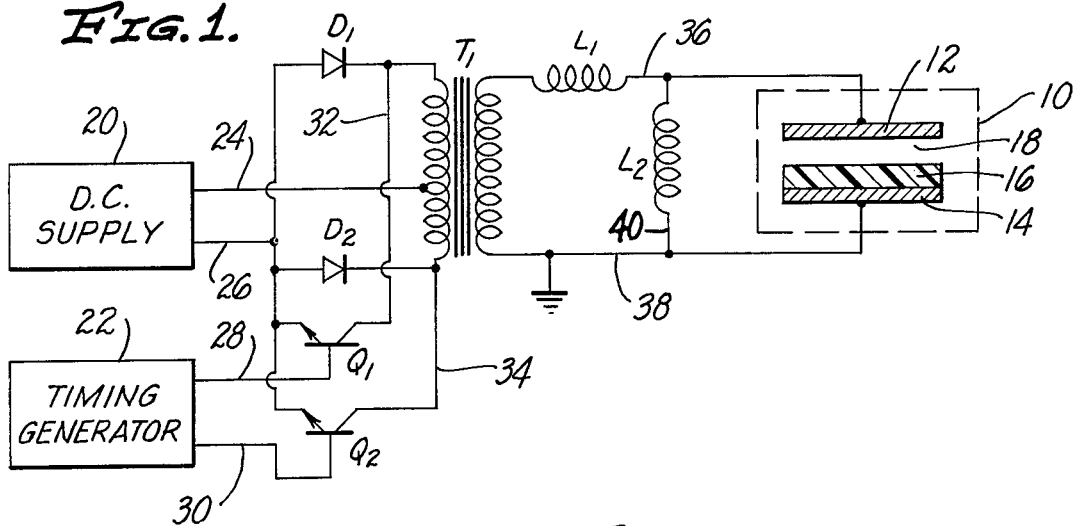
FIG. 1 is a schematic view of a presently preferred combination of a power supply apparatus in accordance with this invention for use with an electron emission fluid treatment cell such as an ozonizer and such a cell.

The essential piece of equipment employed in this invention is, of course, a cell 10 for fluid treatment by electron emission. In FIG. 1 of the drawing such a cell 10 is diagrammatically indicated as an ozonizer cell 10 consisting of first and second flat metal electrodes 12 and 14 separated by a dielectric layer 16 of uniform thickness and characteristics located against the surface (not separately numbered) of the electrode 14. An air gap 18 of uniform thickness is located between the dielectric 16 and the electrode 12. In the interest of brevity the usual inlet and outlet to opposed portions of the air gap 18 are not illustrated. It is to be understood that this ozonizer cell 10 can be constructed in a number of different ways.

For the purposes of understanding this invention it can be assumed that the cell 10 is constructed in a conventional or known manner since the present invention is applicable to utilization with conventional ozonizers and similar devices for fluid treatment by electron emission as well as for utilization with new and improved devices of this type. In practicing the invention, however, with a known type of ozonizer or similar structure it may or may not be necessary to vary specific dimensions such as, for example, the thickness off the air gap and the thickness and material within the dielectric 16 in order to obtain satisfactory results.

With the present invention in effect the cell 10 becomes an integral part of the circuit utilized to provide a current to the cell 10 in order to accomplish fluid treatment. This circuit includes a power supply 20 and a timing generator 22. One terminal of the power supply 20 is directly connected to a center terminal on a primary of a transformer T-1 through the use of a lead 24. The other terminal of the power supply 20 is connected through lines 26 in which there are located diodes D-1 and D-2 connected to the ends of the primary of transformer T-1 which are remote from each other. These lines 26 are also connected to the emitters of transistors Q-1 and Q-2.

The bases of these transistors Q-1 and Q-2 are connected through separate lines 28 and 30 to the terminals of the timing generator 22 while the collectors of the transistors Q-1 and Q-2 are connected through other lines 32 and 34 to the ends of the primary of the transformer T-1 which are remote from one another. The ends of the secondary of transformer T-1 are connected through further lines 36 and 38 to the electrodes 12 and 14, respectively. An inductor L-1 is located in the line 36 adjacent to the secondary of the transformer T-1 while another inductor L-2 is located in a further line 40 extending between the lines 36 and 38 so as to be shunted between the electrodes 12 and 14. It will be noted that this inductor L-2 is located on the side of the inductor L-1 remote from the transformer T-1.

The DC power supply 20 employed with the circuit illustrated is of a known or conventional type constructed in accordance with conventional practice. The DC supply impedance of this supply 20 should preferably be approximately equal to the load impedance presented by the circuit described. This impedance of the power supply 20 must be obtained as a regulator characteristic of the power supply 20 rather than as an actual impedance. With such an impedance relationship the supply voltage that is applied will change with the load provided by the circuit described in such a manner as to maintain a nearly constant load power during changes in the impedance of the load presented by the circuit as the circuit is operated.

In order for the power supply 20 not to interefere with the action of the transformer T-1 and the inductor L-1 the voltage and current effects of the supply impedance at the operating frequency of a timing generator 22 must be negligible with respect to the voltage and current effects of the transformer T-1 and the inductor L-1. This supply 20 must be constructed in such a manner that surges of current (or electrical energy) will be accepted by it as they are returned to it during the operation of the complete circuit illustrated.

The timing generator 22 is of conventional digital construction and is intended to supply current pulses to the transistors Q-1 and Q-2 so that these transistors operate in a saturated mode during the use of the illustrated circuit. The timing generator 22 is intended to provide square wave pulses to operate these transistors Q-1 and Q-2. A number of known arrangements of oscillators, counters and one-shots are known which can be utilized to produce pulses for operating the transistors Q-1 and Q-2 in the desired manner.

The primary function of the transformer T-1 is, of course, to step up the output of the power supply 20. However, with the invention this transformer T-1 serves another important function. In effect, both of the windings of the transformer T-1 can be considered as inductors. With the present invention the secondary of the transformer T-1 is utilized as an inductor in order to in effect store energy in a known manner in such a way as to achieve the mode of operation of the cell 10 hereinafter described.

It is at least theoretically possible to wind the transformer T-1 in such a manner that the inductances unavoidably associated with the transformer T-1 serve as either the inductor L-1 or as both of the inductors L-1 and L-2. It is considered that as a practical matter the inductor L-1 is best provided or obtained through the utilization of the leakage inductance of the transformer T-1. This inductor L-1 is shown in the drawing as a separate inductor primarily for ease of explanation. It is, however, possible to wind the transformer T-1 so that a separate inductor L-1 is utilized. Because of problems associated with the design and construction of a transformer such as the transformer T-1 it is considered undesirable to utilize a transformer T-1 in which the magnetizing inductance associated with the transformer serves as the inductor L-2. Because of this a separate inductor L-2 should normally be utilized.

The operation of the described circuit at first consideration seems surprisingly simple. As the power supply 20 is operated the timing generator 22 will turn on the transistor Q-1 allowing power to flow to a part of the primary of the transformer T-1. Due to the action of the transformer T-1 a current will then be generated in the secondary of the transformer T-1 and this current will be supplied through the inductor L-1 to the electrodes 12 and 14. Concurrently some of the supplied current will be shunted between the electrodes 12 and 14 by virtue of the operation of the inductor L-2.

Then the timing generator 22 will cut off the operation of the transistor Q-1 and, after an interval, will supply a pulse turning on the transistor Q-2. This will again supply power to a part of the primary of the transformer T-1 and this in turn will cause the development of a current in the reverse direction in the secondary of this transformer T-1. This in turn will result in a reverse flow of power to the electrodes 12 and 14 and through the inductors L-1 and L-2. Then the timing generator 22 will shut off the transistor Q-2 for an interval before power is again supplied to the transistor Q-1.

It is specifically noted that these transistors Q-1 and Q-2 are turned on at time intervals which are deliberately separated from one another the same amount. Further, these transistors Q-1 and Q-2 are turned on for intervals of the same time duration. With this manner of operation the current caused to be generated in the secondary of the transformer T-1 is deliberately intended to have a non-sinusoidal wave form so that both the voltage and current at the cell 10, and more specifically across the air gap 18, during any specific current cycle will, as a result of the interaction of the cell 10 and the various circuit components described, have wave form approximating the desired current and voltage wave forms indicated in FIG. 3 to as great an extent as is reasonably possible.

It is considered that the invention can be best understood by referring to the reasons why these wave forms are desired before more fully describing the operation of the circuit indicated in the preceding discussion. This, of course, requires a discussion as to the mechanism by which chemical changes and/or reactions result from the operation of a cell for the treatment of fluid by electron emission. The mechanism will, of course, vary to some extent depending upon the specific fluid treated in such a cell. However, as a practical matter the manner in which such a cell normally operates may be illustrated with reference to the production of ozone by the treatment of pure oxygen or a gas mixture such as air containing oxygen.

In a cell such as the cell 10 operated as an ozonizer the voltage gradient across the air gap 18 must reach a specific threshold value which is dependent upon factors such as the gas and/or gas mixture passing through this air gap 18, the thicknesses of the air gap 18 and the dielectric layer 16, the nature of this dielectric layer 16 and the like, and various other factors as are recognized in the field of the invention, before any chemical change and/or reaction will result from electron movement and/or emission. At the start of a current cycle after such a voltage is reached, electrons will flow from an electrode such as the electrode 12 across the air gap 18 and will tend to accumulate on the dielectric layer 16.

As they move they will strike the normal $O_2$ oxygen atoms so as to break up and activate these atoms in order to form ions such as the $O+$ and $O_2+$ ions and frequently other ions. As this occurs in the presence of electrons moving within the air gap 18 electrons will be given off from the oxygen $O_2$ molecules and probably from other ions present while concurrently the various ions and/or activated molecules present will tend to recombine with each other and the normal $O_2$ oxygen molecules to form $O_3$ and probably various complexes of $O_3$ molecules with either other ozone molecules and/or ions. The latter to a degree will also tend to decompose and recombine. Various other reactions may also transpire, as for example with the nitrogen in air.

As the cell 10 is operated, these various products of the electron emission and the combination and recombination of atoms, molecules and ions within the air gap 18 will be swept through the cell 10 as the result of fluid flow supplying "new" fluid such as pure oxygen of air to the cell 10. As the fluid treated within the cell 10 moves out of and away from the cell 10 the mixture created as a result of the operation of the cell 10 will tend to stabilize into stable or reasonably stable molecular forms. Thus, during the production of ozone a gas as indicated passed through the air gap 18 and out of the cell 10 will tend to stabilize as it passes from this cell 10 into a mixture of normal molecular oxygen $O_2$ and ozone $O_3$. The efficiency of the cell 10 will normally be measured in terms of the amount of a product such as $O_3$ in the output from the cell 10 which is created per unit of electrical power supplied to the cell 10.

Hence, in order to increase the electrical efficiency of the cell 10 it is necessary to operate this cell 10 in such a manner as to utilize the applied electrical power in the most effective manner so as to minimize undesired reactions within the cell 10. Such minimization involves a number of factors. It involves minimizing the use of electrons for mere production of ions. It also involves minimizing the decomposition of $O_3$ ozone molecules within the cell 10. It further involves the minimization of the power consumption necessary to reverse the polarity of the electrodes 12 and 14 within the cell.

Such reversal is necessary becase in effect the dielectric layer 16 within the cell 10 operates as a capacitor which is charged to a certain extent as the result of a current being applied in one direction. After such "charging" no further electron emission will occur across the air gap 18 except if the voltage of the applied current is increased. There is, however, a limit as to the extent that the voltage may be increased because if the voltage is increased to too great an extent the dielectric layer 16 will "break down" and become conductive. This will, of course, result in current flow directly between the electrodes 12 and 14. When this occurs the cell 10 is no longer operated as a cell for fluid treatment by electron emission.

For optimum performance with an appropriate dielectric the voltage across the dielectric (corrected for the voltage changes which will occur during polarity reversal) at the time polarity reversal is begun should equal the threshold voltage of the air gap 18. As indicated in the preceding discussion the threshold voltage will be dependent upon a number of factors. It is considered that appropriate dielectrics having sufficient dielectric strength, including composite or multilayered dielectrics for use with the invention, are normally difficult to obtain.

When what is referred to in the preceding as an "appropriate" dielectric is not available it is necessary that the voltage applied to the electrodes 12 and 14 never exceed the voltage at which scintillation or equivalent dielectric breakdown would occur between the electrodes 12 and 14. For safety's sake the applied voltage should always be slightly less than such voltage. However, the voltage applied should approach this voltage to as great an extent as reasonably possible in order to obtain maximum efficiency. It is considered that the best utilization of power requires that the voltage applied to the electrodes 12 and 14 should always be greater than about 90 percent of the voltage at which breakdown would occur.

The reversal of the polarity of the electrodes 12 and 14 when these electrodes have been charged to the maximum extent that voltage limitations permit, of course, tends to recreate electron emission, and when the reverse voltage reaches a specific or threshold value as indicated in the preceding discussion electron emission will occur as current is applied in the reverse direction until such time as the cell 10 becomes charged in the reverse direction. Then it is necessary to reverse the current so as to repeat the cycle of operation indicated. Electrical efficiency during such charging and reversal is dependent upon a number of factors.

A significant one of such factors relates to the operation of the cell itself. It operates to a degree as a means for storing electrical energy. In this respect it is analagous to a conventional capacitor and as the cell 10 becomes charged in either direction electrical energy is applied to it so as to charge it up and in effect some of such energy is "stored" in the form of the electrostatic field resulting from the cell 10 being charged. On the reversal of the polarity of the cell 10 any such field created must be collapsed. Energy is required to both collapse this field and to recreate a corresponding field as the cell 10 is charged during the next half cycle of operation in a reverse direction.

Figure 2A:
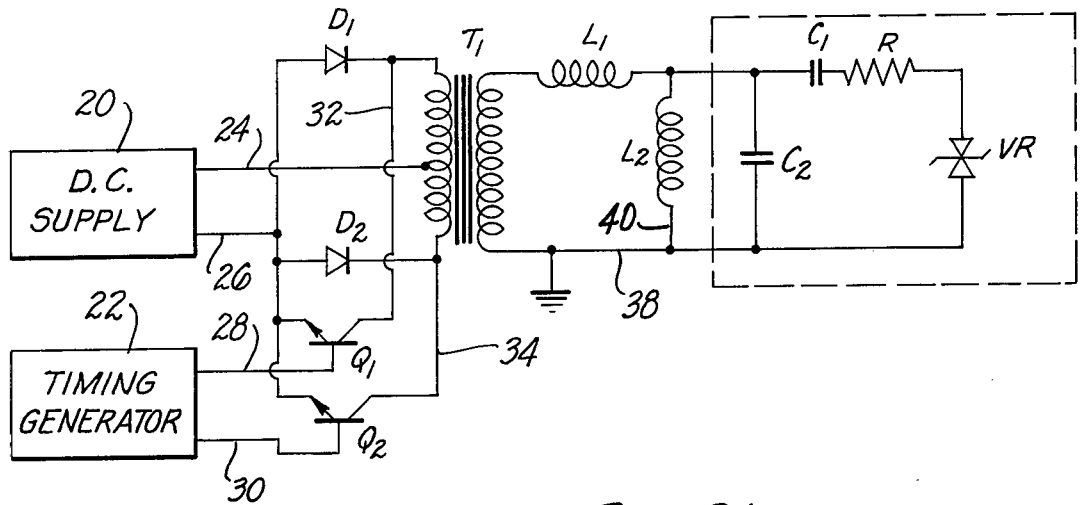
FIGS. 2(a) and 2(b) are views corresponding to FIG. 1 in which the cell shown in FIG. 1 is represented in different manners.
Figure 2B:
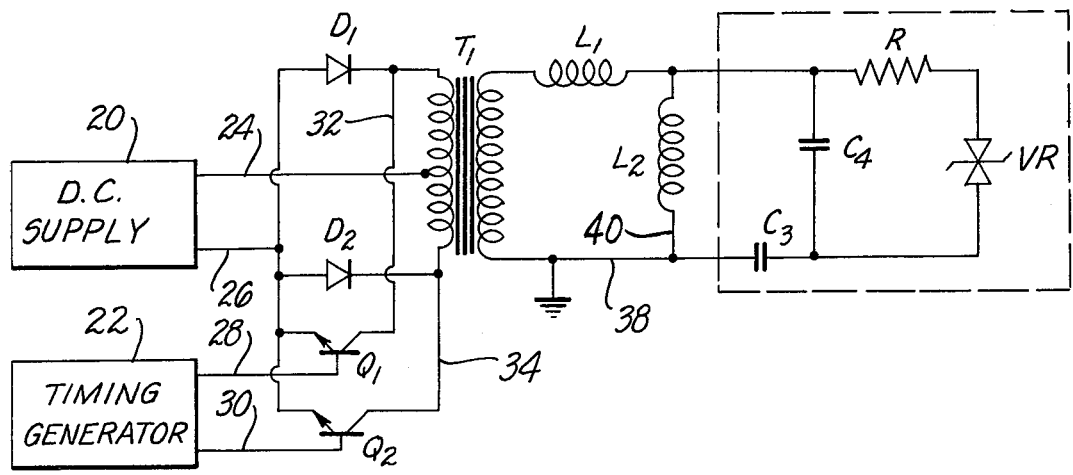

To a degree this is an oversimplification in that it does not completely indicate the actions taking place within the cell 10 from an electrical standpoint. A cell such as the cell 10 can be represented as a series of electronic components as indicated in FIGS. 2(a) or 2(b) of the drawing. The two circuits representing the cell 10 indicated in FIGS. 2(a) and 2(b) are related by electrical laws. They are considered to be related ways of expressing the electrical performance of the cell 10 and/or the manner in which the cell 10 performs from an electrical standpoint.

In FIG. 2(a) of the drawing the capacitor C-2 is intended to designate the capacitance which can be measured across the terminals in the cell 10 by a bridge at a comparatively low voltage and the capacitor C-1 is intended to indicate the difference or discrepancy between the capacitor C-2 and the actual dielectric capacitance of the cell 10. This manner of representation differs from FIG. 2(b) in that in FIG. 2(b) the dielectric capacitance of the cell 10 is indicated as C-3 while the actual air gap capacitance of the cell 10 is indicated as C-4.

In both FIGS. 2(a) and 2(b) a bi-directional zener diode VR is indicated to represent or symbolize the critical or transitional voltage at which electron emission will occur across the air gap 18. Both FIGS. 2(a) and 2(b) also show a resistor R representing or symbolizing the resistance exhibited within the cell 10 to current flow as the cell 10 is used. In effect, the resistor R designates the energy consumed within the cell 10 in sustaining plasma or electron emission. On occasion the cell 10 can be considered as two capacitances connected in series such as, for example, two capacitances C-3 and C-4 in FIG. 2(b) with the resistor R and the zener VR omitted from this figure.

In analyzing the operation of the cell 10 it may be considered that energy used to sustain electron emission is necessary but that such energy may also have undesirable aspects because of heat generation. In a cell such as the cell 10 this matter of heat production is quite important. While in some cases heat accumulation can be valuable, normally any significant heat buildup will tend to detrimentally affect normally desired reactions. This can be illustrated by referring to the fact that the $O_3$ ozone molecule is temperature sensitive and tends to break down at a rate which increases with temperature. Because of this it is normally desired to operate a cell such as the cell 10 at as low a temperature as reasonably possible consistent with adequate power being consumed to maximize the production of a desired product such as ozone.

It has been long recognized that this consideration makes it desirable to operate a cell such as the cell 10 with the current density on the electrodes 12 and 14 as low as reasonably possible. This matter of temperature is, of course, related to a number of different items. It is considered that the useful power consumed in a cell such as the cell 10 is proportional to the current flowing through the resistor R in the analagous circuit noted in the preceding, while the power wasted in heat buildup in the cell 10 is proportional to the square of this same current. The temperature at which the cell 10 is operated is, of course, related to other factors such as the temperature of the fluid treated, the rate and quantity of fluid movement through the cell, and the rate at which heat is dissipated from the cell 10 either through the use of a cooling jacket and/or to the ambient surroundings.

In a circuit as indicated the current flow is, of course, related to the applied voltage and as the voltage applied to the electrodes 12 and 14 of the cell 10 builds up the current also increases. As indicated in the preceding discussion there is a limitation brought about by the physical characteristics of the cell 10 which limits the maximum voltage which can be applied before the current (and voltage) applied to the cell 10 has to be reversed. The fact that the dielectric 16 becomes "charged" necessitates a reversal in polarity of the current supplied to the cell 10 when the dielectric 16 becomes charged, so that the cell 10 will remain active in the emission of electrons a maximum amount.

Figure 3A:
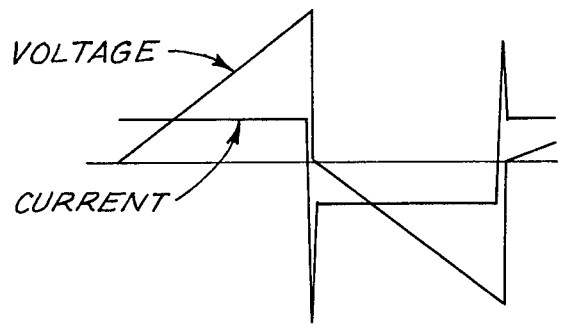
FIGS. 3(a) and 3(b) show voltage and current wave forms for use with a cell as indicated in the preceding, those shown in FIG 3(a) being the physically unobtainable optimum desired for use with the invention and those shown in FIG. 3(b) being a realizable approximation of the same.
Figure 3B:
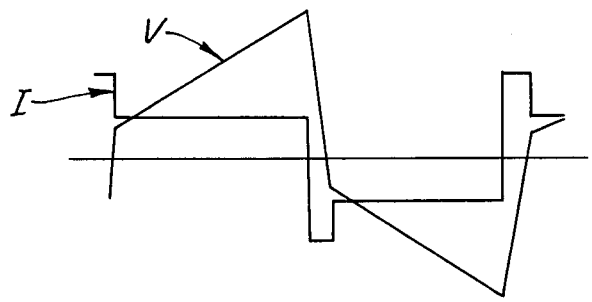

This is considered to necessitate extremely rapid reversals in both current and voltage polarity. In accordance with this invention it has been recognized that in theory the maximum effective use of the cell 10 requires that at the start of a current cycle that the voltage be instantaneously raised to a threshold value as indicated in FIG. 3(a) and that thereafter the voltage be constantly increased at a steady, uniform rate corresponding to a uniform current flow of such magnitude as to most efficiently cause desired chemical changes and/or reactions such as those leading to the production of ozone. Thereaftr the present invention recognizes that as soon as the voltage reaches a point where breakdown is apt to occur that the voltage should be instantaneously reversed to an opposite critical voltage at which electron emission commences, and that thereafter the voltage should be constantly increased in the same manner until the danger of breakdown makes it again necessary to reverse the voltage instantaneously so as to start the current cycle again.

If it were possible to achieve such instantaneous applications of and/or reversals of voltage the current flowing through the cell 10 would have a wave shape or form as indicated in FIG. 3(a). Here it is indicated that between such instantaneous voltage reversals and/or changes indicated that the current flow should be uniform during both halves or portions of a current cycle as described in the preceding. Here it is also indicated in a diagrammatic manner that at the instant of such voltage changes or reversals in theory the current flow would be more or less infinite in character.

If voltage and current flows of a theoretical type as indicated in FIG. 3(a) could be achieved at all times the cell 10 would be operated to cause desired changes and/or reactions. This is because the changes in ;the voltage and the current applied to the cell 10 would be instantaneous and would not represent and "down" time or inoperative time when the cell 10 was not being utilized for its intended purpose. Further, if a theoretical current flow as indicated in FIG. 3(a) could be obtained at all times the quantity of electron emission in the air gap 18 could be regulated so as to provide a uniform rate of electron (and ion) movement and combination, breakdown and recombination of molecules within the air gap 18 which is most effective in causing the desired changes and the reactions. The value of such a current in a particular cell is considered to vary in accordance with the physical characteristics of the cell itself and the manner in which the cell is operated.

Figure 4:
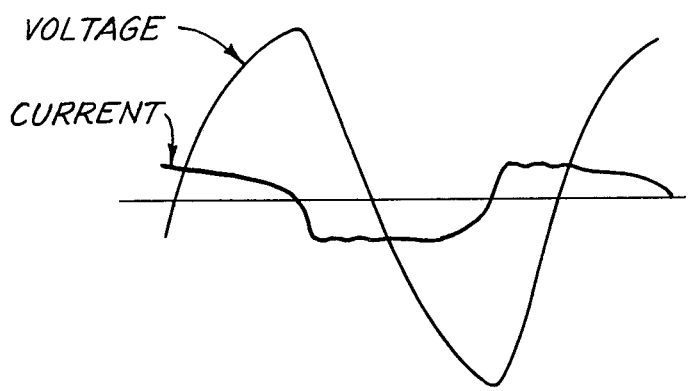
FIG. 4 shows curves of the current and the voltage which have been applied to the electrodes of such cell utilizing a circuit constructed in accordance with this invention in conjunction with a cell designed to be employed with this circuit.

Unfortunately it is impossible in practice to achieve instantaneous voltage and/or current reversal. Further, with the type of circuitry employed with a cell such as the cell 10 an instantaneous voltage reversal would be undesirable because of currents in other than the cell 10. Such currents would cause infinite losses within circuit components. To reduce such losses the wave forms should be modified to correspond to those shown in FIG. 3(b). This is considered to accomplish as close to instantaneous voltage and current reversals without significant losses as it is possible to obtain utilizing present day electronic components. Actual voltage and current wave forms as have been achieved are indicated in FIG. 4 of the drawing. These are considered to approximately correspond to the wave form indicated in FIG. 3(b).

In practice, at the start of a current cycle the voltage is rapidly increased at as fast a rate as it is possible to increase the voltage in view of circuit losses until a voltage is reached at which the electron emission commences. Thereafter this voltage is more gradually increased at a substantially uniform rate so as to provide substantially uniform current flow until such time as the maximum voltage is reached which is greater than about 90 percent of the voltage at which scintillation or breakdown will occur but which is less than such voltage. Thereafter the voltage is reversed as rapidly as reasonably possible at a comparatively rapid or steep rate until the transistional voltage at which electron emission occurs with a reverse current is achieved. Then the voltage is gradually increased in the reverse direction as indicated in the preceding until a limiting voltage as indicated in the preceding is reached. Next, the voltage is reversed as rapidly as reasonably possible until the current cycle is recommenced.

These changes in voltage are accompanied by changes in current as indicated in FIG. 4. Here it is indicated that the current applied to the cell 10 is reasonably uniform throughout the period when there is what was referred to in the preceding as a gradual change in the voltage. This gradual change as described is intended to provide substantially uniform current flow and corresponding substantially uniform electron emission.

These voltage and current wave forms are considered to be related to the circuit described in the preceding in what is considered to be a unique manner. During the operation of the timing generator 22 and the power supply 20 at the time interval corresponding to the start of a reversal in the voltage applied to the cell 10 in effect electric power will be stored within the circuit in several different manners. Some such power will be stored in the cell 10 itself in the form of an electrostatic field associated with the cell 10 as the result of the cell 10 being "charged" in more or less the manner in which a capacitor is charged.

Other power or energy is considered to be stored in this system in the form of magnetic fields associated with the transformer T-1 and the inductors L-1 and L-2. It is well known that no transformer will exhibit theoretically ideal performance characteristics and that any transformer used will have shunt and series inductances, shunt capacitances and the like and other departures from "ideal" performance characteristics. For the purpose of circuit analysis in connection with the invention all of such factors other than the magnetic fields associated with the transformer T-1 can be considered to be of only limited or secondary importance.

It is considered simplest to explain the operation of the circuit indicated by considering that the secondary of the transformer T-1 does not have any leakage inductance and by in effect considering that the inductance of the inductor L-1 is the sole inductance in series in the line containing the secondary of the transformer T-1 and the inductor L-1. In a sense this may be regarded as a sort of useful fiction, particularly since as indicated in the preceding, the transformer T-1 may be wound in accordance with conventional practice so as to include the inductor L-1.

Such operation is commonly best described by considering what happens in this circuit at the instant either of the transistors Q-1 or Q-2 is turned on for a time through the operation of the timing generator 22. This particular instant has been picked as the best "starting point" in describing the operation of the illustrated circuit because at this point the interactions of various circuit components is considered to be at a comparative minimum. At this particular time the polarity of the cell 10 will have been reversed for a time interval and, as a result of the mechanism as hereinafter indicated, there will be some electron emission in the cell 10 as the result of the utilization of energy stored within the system.

The transistor Q-1 or Q-2 turned on as in the preceding is turned on at a time as required to supply further energy to sustain electron emission within the cell 10 at a substantially uniform rate. Such further energy is to be applied through the transistor Q-1 or Q-2 so that the power applied "takes over" as the power used from within the system tapers off so as to achieve substantially uniform current flow and/or substantially uniform electron emission in the cell 10.

As the power is applied in this manner the voltage from the power supply 20 will, of course, be stepped up in a conventional manner and the output voltage from the transformer T-1 will be applied to the portion of the circuit generally to the right of the transformer T-1 in the drawing. Concurrently as a magnetic field is built up in association with the inductor L-1 the limiting action of this inductor L-1 will cause the current applied to the terminals of the cell 10 to increase relatively slowly as power is supplied through a particular transistor Q-1 or Q-2. As subsequently indicated such a transistor Q-1 or Q-2 is turned off when the current applied to the cell 10 maximizes as a result of the limiting action of the inductor L-1.

A portion of the current from the transformer T-1 and the inductor L-1 will flow through the inductor L-2 as a particular transistor Q-1 or Q-2 is conductive so as to build up a magnetic field in association with this inductor L-2. It is noted, however, that the inductor L-2 will exercise a limiting action so that, when the various components are proportioned as desired, the current flowing through the inductor L-2 does not work in opposition to the current applied directly to the cell 10 through the inductor L-1 prior to the next phase of the operation of the circuit. Prior to this next "step" it is important that the voltage in the cell 10 be increased past the voltage of the secondary of the transformer T-1. Normally if there is not sufficient voltage in the cell 10 at this point either the circuit is being operated at too high a voltage or the voltage delivered by the transformer T-1 is inadequate.

When the voltage across the cell 10 exceeds the voltage of the secondary of the transformer T-1 the particular transistor Q-1 or Q-2 which has been turned on will be turned off because of the action of the timing generator 22. At this instant the voltage across the secondary of the transformer T-1 will change quite rapidly, passing through zero and developing a large voltage of a reverse polarity. The voltage across the primary of the transformer T-1 will go through a corresponding change until such time as one of the diodes D-1 or D-2 becomes forward biased. If the transistor which was previously conducting was the transistor Q-1 the diode D-2 will become forward biased. If the transistor which was previously conducting was the transistor Q-2 the diode D-1 will become forward biased. At this time the voltages of the primary and the secondary of the transformer T-1 will become substantially constant until the magnetic field of the inductor L-1 collapses. These diodes D-1 and D-2 are so connected to one another and the power supply 20 so that as long as the particular diode noted remains forward biased power will be returned to the power supply 20 from the transformer T-1 and the various components of the circuit to the right of this transformer as viewed in FIG. 1.

As this field of the inductor L-1 collapses the current through the inductor L-1 will decrease in accordance with the collapse of this field and will soon become smaller than the current flowing through the inductor L-2. When this current through the inductor L-1 becomes smaller than the current through the inductor L-2 the current passing through the cell 10 will reverse in direction and the polarity of this cell 10 will commence its reversal. kWhen the current through the inductor L-1 decreases to zero the voltage across the secondary of the transformer T-1 will again change rapidly as a result of the voltage across the cell 10. This voltage change is in such direction as to turn off the diode D-1 or D-2 which has been forwardly biased. At this point the voltage across the cell 10 and the inductor L-2 still is larger than the voltage previously present at the terminals of the secondary of the transformer T-1 during the time when the transistor Q-1 or Q-2 was conductive. This voltage across the cell 10 and the inductor L-2 will then tend to be impressed on the secondary of the transformer T-1.

Because of the action of the transformer T-1 a voltage will be present at the primary of the transformer T-1 in accordance with the changes in the voltage at the secondary of the transformer T-1. The diode D-1 or D-2 which was not previously forward biased will now become forwardly biased, limiting the voltages at the terminals of the transformer T-1. As long as such diode D-1 or D-2 remains forwardly biased power will be returned to the power supply 20 as described. At this time a reversed current will begin flowing in the inductor L-1. This current adds to that flowing through the inductor L-2 and appears as a large current flowing through the cell 10 rapidly reducing the voltage across the cell 10. This voltage change across the cell 10 causes a reduction in the current flowing through the inductor L-1. This current decreases to zero and the diode D-1 or D-2 which was just forwardly biased will cease to conduct as a result of the voltage across the primary and secondary of the transformer T-1 concurrently decreasing.

Since the polarity of the voltage applied across the cell 10 and the inductor L-2 during these "events" as described in the preceding remains substantially constant the magnetic field associated with the inductor L-2 will continue to increase during these "events". Also the current associated with this magnetic field will continue to increase in a manner corresponding to this increase. After the diode D-1 or D-2 which was last forwardly biased ceases to be conductive the cell 10 becomes the only available source of the current associated with the field of the inductor L-2. So the voltage across the cell 10 continues to collapse, and in particular, the voltage which can be identified with the portion of the cell 10 designated as C-4 in FIG. 2(b) continues to collapse.

As the voltage across that portion of the cell 10 represented as the capacitor C-4 drops the voltage across that portion of the cell 10 represented as the capacitance C-3 will decrease only slightly so that the terminal voltage of the cell 10 will still not have reached zero. As the voltage across the terminal of the cell 10 continues to decrease the current through the inductor L-2 will continue to rise and energy will again be stored in C-4. At this point the voltage across that portion of the cell 10 represented as the capacitance C-4 will have reversed while the field associated with that portion of the cell 10 represented as the capacitance C-3 will not have changed significantly. Next the field of the capacitance C-3 portion of the cell 10 will begin to collapse.

As this occurs a current will be produced from the capacitance C-3 portion of the cell 10. Because that portion of the circuit containing the transformer T-1 and the inductor L-1 will act as an open circuit such current will flow through the inductor L-2 reversing the polarity on that portion of the cell 10 designated as the capacitance C-4. Soon thereafter the cell 10 will reach a voltage at which electron emission or discharge begins in the air gap 18. This will be shortly after the terminal voltage of the cell 10 passes through zero. Thereafter the collapse of the field of the capacitance C-3 portion of the cell 10 and subsequently the field of the inductor L-2 will produce currents which sustain the emission in the air gap 18 until these fields are nearly collapsed.

At this point when the current supplied is nearly too low to sustain such emission the transistor Q-1 or Q-2 not previously turned on will be turned on through the operation of the timing generator 22. This will, of course, result in power being supplied from the power supply 20 to the primary of the transformer T-1. At this point in time another half cycle of operation which may be termed a mirror image of the previously described half cycle of operation will continue in the manner previously described.

As power is supplied as a result of a transistor Q-1 or Q-2 being turned on the inductor L-2 will exercise a shunting action and the applied current will to a degree be shunted across the electrodes 12 and 14 and the cell 10. The current flowing through the inductor L-2 in this manner will be utilized to build up a magnetic field in association with the inductor L-2. With the described circuit the inherent resistance to current flow of the inductor L-2 will delay the flow of current and the buildup of the magnetic field to a sufficient extent so as to permit the cell 10 to reach nearly the breakdown or scintillation voltage at substantially the same time as the current through the inductor L-2 tends to interfere with the cell 10 being operated so as to achieve substantially uniform electron emission in the air gap 18. This interference then becomes the major portion of the current utilized to reverse the polarity of the voltage across the cell 10.

In the preferred method of operation in accordance with the invention the various components are selected in such a manner that during a half cycle of operation as described such a voltage will be achieved across the air gap 18 shortly after the electrostatic field associated with the cell 10 starts to collapse so as to provide energy which is used to charge the cell 10 in a reverse polarity. When such a transitional voltage or critical voltage is reached at this point in a half cycle of operation the further collapse of the field associated with the cell 10 is initially used to supply energy to sustain electron emission in the cell 10 and then the field associated with the inductor L-2 is to a degree used for this same purpose. With this method of operation power is supplied from the power supply 20 at about the point that there is no longer a voltage buildup across the cell 10 as the result of fields as described collapsing in such a manner that the electron emission within the air gap 18 remains substantially constant.

The particular power supply 20 used may be regarded as a "means" for both supplying power from an external source so as to drive or operate the cell 10 and as a "means" for storing power obtained as a result of reversing the polarity of the cell 10 and for resupplying such stored power along with the power from an external source. The transistor Q-1 and Q-2 used may be regarded as essentially "switch means" for allowing power to pass from the power supply 20 to the transformer T-1 at timed intervals as are indicated herein. Similarly the diodes D-1 and D-2 may be regarded as other "switch means", only they are different from the transistors Q-1 and Q-2 in that they block the flow of power from the power supply 20 and yet permit the movement of power or energy generated as a result of reversal of cell polarity back to the power supply 20.

The transformer T-1 employed is of course a "means" for changing voltage and current in accordance with conventional practice. Because the secondary of this transformer T-1 in fact acts as an inductor to such an extent that the inductor L-1 may be "wound into" the transformer T-1 this transformer may also be considered as being an inductor or "inductor means". In a similar vein the inductor L-1 may be considered as an inductor associated or in series with the transformer T-1. Both the secondary leakage inductance of the transformer T-1 and the inductor L-1 have been and can properly be referred to as a single "inductor means". The inductor L-2 may be considered as a bypass or shunt inductor or "inductor means" shorting out the terminals of the cell 10.

Because the primary of the transformer T-1 and, where used, the inductor L-1 and the inductor L-2 all are employed so as to store "energy" in the form of the magnetic fields these parts may also be referred to as "means" for storing energy while permitting current flow. The specific inductor L-2 may also be considered as a "means" shorting the electrodes 12 and 14 so that energy may be transferred between these electrodes on the discharge of the cell 10 when the polarity of the cell 10 is reversed. This cell may also be looked upon as a "means" for storing electrical energy in the form of an electrostatic field while permitting electron emission.

For the mode of operation described in the preceding to be achieved the various electrical values of components must be closely correlated with one another. It is considered that ideally the ratio of the inductance of the inductor L-2 to the leakage inductance referred to the secondary of the transformer T-1 when no separate inductor L-1 is employed and to the sum of the secondary leakage inductance of the transformer T-1 and the inductor L-1 when the inductor L-1 is employed should be approximately equal to one plus the ratio of the capacitances C-1 and C-2 indicated in the preceding discussion. It is considered that a typical transformer for use as a transformer T-1 should have a magnetization to leakage ratio of more than 10.

The mode of operation described obviously requires precise control of time intervals at which power is either supplied or cut off. For satisfactory operation it is considered necessary for the operating frequency of the system to be higher than the resonant frequency of that portion of the system containing only the inductor L-2 and the cell 10 and lower than the resonant frequency in that portion of the system containing only the secondary of the transformer T-1, the inductor L-1 in those cases where a separate inductor L-1 is used, or the inductor L-2 in the cell 10. The secondary leakage inductance of the transformer T-1, the inductance of the inductor L-1 when a separate inductor L-1 is used, and the inductance of the inductor L-2 are in effect determined by the specific physical structure of the cell 10 used and by the preferred operating frequency necessitated by the physical structure of the cell 10 employed.

Normally this cell 10 will not be a simple cell as diagrammatically illustrated in the drawing, containing only two electrodes, a single air gap, and a single dielectric or dielectric layer, but will consist of a complete electron emission unit having a plurality of such cells in parallel with one another. Normally the dielectric 16 used in a cell 10 will be a multilayered structure in which the layers are not necessarily of a single material. The surface of the dielectric 16 exposed to the air gap 18 and the corresponding surface of the electrode 12 may be coated with a catalytic material. For the production of ozone preferably these surfaces are coated with titanium dioxide in order to promote the formation of ozone. The construction of the cell 10 is considered quite important in obtaining satisfactory electric efficiency and satisfactory long term performance.

The "key" to the present invention and the effectiveness of the invention lies in the achievement of electrical efficiency through the use and reuse of applied power in such a manner that as a practical matter nearly all of the power that is consumed is consumed in causing and sustaining electron emission of the cell 10. With the present invention what may be referred to or considered as driving power obtained from the power supply 20 is in part stored in the system in the form of fields as indicated and such stored power is recovered and is used to accomplish the reversal of cell polarity without the application of external power. Such stored energy or power is also utilized to feed back power which is subsequently utilized in order to sustain electron emission. As a consequence of such effective use of energy it is considered that the invention described may be employed much more effectively and much more efficiently than prior related structures.

In case those skilled in the art to which this invention pertains might have difficulty in designing a specific circuit and emission cell utilizing the principles of the invention the following specific operational values of a circuit and cell are given merely as design aid. These values are not to be considered as limiting the invention in any respect. In a specific circuit utilizing a cell having a C-1 as identified in the preceding of 1400 pf, a C-2 as identified in the preceding of 1800 pf, can be constructed utilizing a step-up transformer designed to step up voltage from a power supply of 100 volts to a voltage of 3000 volts wound so that the leakage inductance referred to the secondary of this transformer has an inductance of 0.37 hy, with an inductor corresponding to the inductor L-2 having an inductance of 1.0 hy. Such a circuit can be operated at a frequency of 3000 to 4000 cycles per second. Another "key" or important feature in achieving desired results relates to maximizing the time interval during a current cycle during which electron emission occurs. This can be accomplished through adjustment of the circuit frequency. It is considered that to obtain effective results there must be electron emission during at least three-fourths of each half cycle or three-eighths of each complete cycle of the applied signal.

We claim:
1. An apparatus for treating a fluid by electron emission, said apparatus including a cell for fluid treatment by electron emission and a circuit means for supplying an alternating current to said cell in which the improvement comprises:
    said circuit means including power supply means for supplying electric power to the terminals of said cell,
    said circuit means also including means for interrupting power flow from said power supply means to said cell for an interval during each cycle of said alternating current, energy storage means shunted across the terminals of said cell for storing energy when power is supplied to said cell said energy storage means being capable of supplying the energy stored therein to said cell upon the reversal of the polarity of said cell.
2. An apparatus as claimed in claim 1 wherein:
    said circuit means includes other energy storage means connected between said power supply means and said cell for storing energy when power is supplied to said cell said other means being capable of supplying the energy stored therein to said cell immediately after said power supply means no longer supplies power to said cell.
3. An apparatus as claimed in claim 2 wherein:
    both of said energy storage means are inductor means.
4. An apparatus as claimed in claim 2 wherein:
    said said interrupting means includes first switch means for releasing power from said power supply means, and
    said interrupting means also includes timing means for controlling the operation of said first switch means so as to permit energy storage in both of said energy storage means to be supplied to said cell at intervals when power is not released from said power supply means.
5. An apparatus as claimed in claim 4 wherein:
    said circuit means includes transformer means having a primary and a secondary, said primary of said transformer means being connected to said power supply means through said first switch means, said secondary of said transformer means being connected across the terminals of said cell,
    second switch means connected between the primary of said transformer means and said power supply means for permitting power to be supplied to said power supply means, said transformer means being capable of generating a current to supply to said power supply means during the discharge of energy stored in said energy storage means.

6. An apparatus as claimed in claim 5 wherein:
said second switch means comprises diode means.

7. An apparatus as claimed in claim 5 wherein:
both of said energy storage means are inductor means, and at least part of said other energy storage means comprises the leakage inductance of said transformer means.

8. An apparatus as claimed in claim 1 wherein:
said circuit means includes other energy storage means connected between said power supply means and said cell for storing energy when power is supplied to said cell said other means being capable of supplying the energy stored therein to said cell immediately after said power supply means no longer supplies power to said cell, said interrupting means includes first switch means for releasing power from said power supply means, and said interrupting means also includes timing means for controlling the operation of said first switch means so as to permit energy storage in both of said energy storage means to be supplied to said cell at intervals when power is not released from said power supply means, said circuit means includes transformer means having a primary and a secondary, said primary of said transformer means being connected to said power supply means through said first switch means, said secondary of said transformer means being connected across the terminals of said cell, second switch means connected between the primary of said transformer means and said power supply means for permitting power to be supplied to said power supply means, said transformer means being capable of generating a current to supply to said power supply means during the discharge of energy stored in said energy storage means, said second switch means comprises diode means, both of said energy storage means are inductor means, and at least part of said other energy storage means comprises the inductance of the secondary of said transformer means.

9. An apparatus for treating a fluid by electron emission which includes:
power supply means for supplying power,
transformer means for varying voltage and current, said transformer means having a primary and a secondary, first switch means connected between said power supply means and the primary of said transformer means for interrupting power from said power supply means to the primary of said transformer at periodic intervals, timing means for regulating the operation of said first switch means connected to said first switch means, second switch means connected between the primary of said transformer means and said power supply means for permitting power to flow from said transformer means to said power supply means, a cell means for fluid treatment by electron emission, said cell means including two spaced electrodes separated from one another by an air gap and a dielectric, said electrodes being connected to opposed extremities of the secondary of said transformer means, means for storing electrical energy shunted across said electrodes, other means for storing electrical energy in series with the secondary of said transformer means.

10. An apparatus as claimed in claim 9 wherein:
said other means for storing electrical energy is integral with the secondary of said transformer means.

11. An apparatus as claimed in claim 9 wherein:
both of said means for storing electrical energy are inductor means.

12. An apparatus as claimed in claim 9 wherein:
said first switch means are transistor means, and
said second switch means are diode means.

13. An apparatus as claimed in claim 9 wherein:
said other means for storing electrical energy is integral with the secondary of said transformer means,
both of said means for storing electrical energy are inductor means,
said first switch means are transistor means, and
said second switch means are diode means.

* * * * *